March 2, 1965  R. G. STERN  3,171,954
ANALOG COMPUTING SYSTEM HAVING DYNAMIC SERVO RESPONSE
Filed Feb. 8, 1960
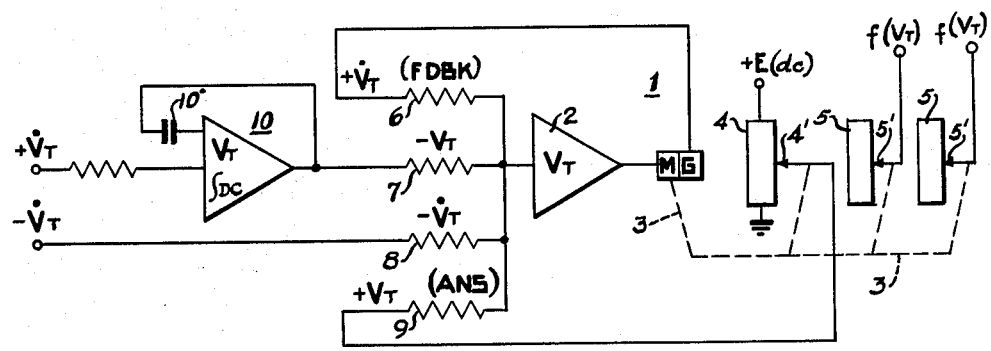
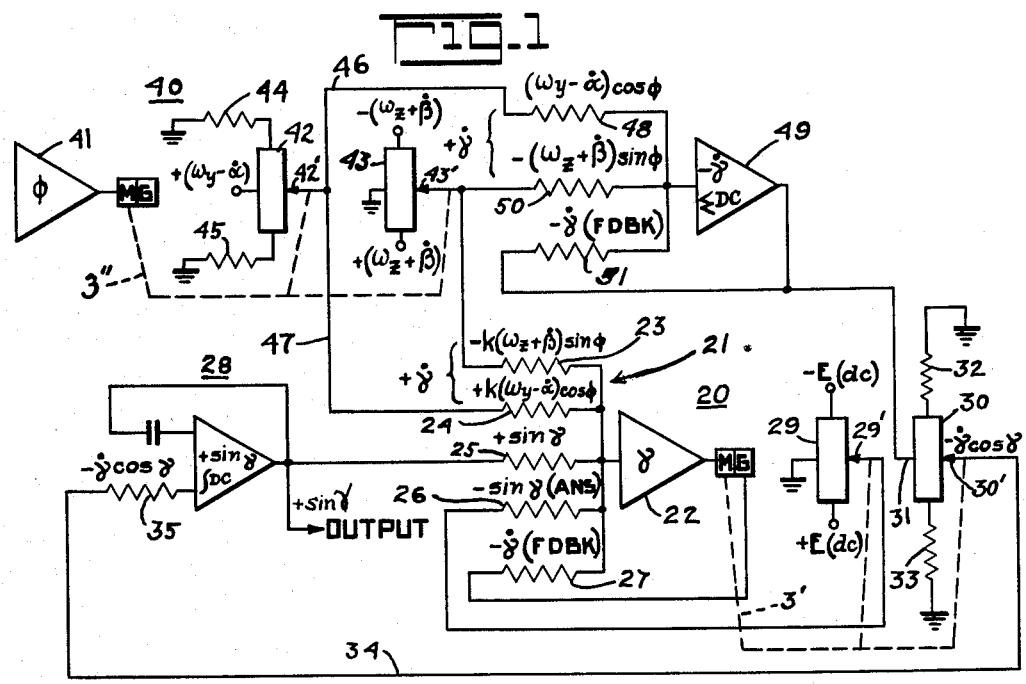
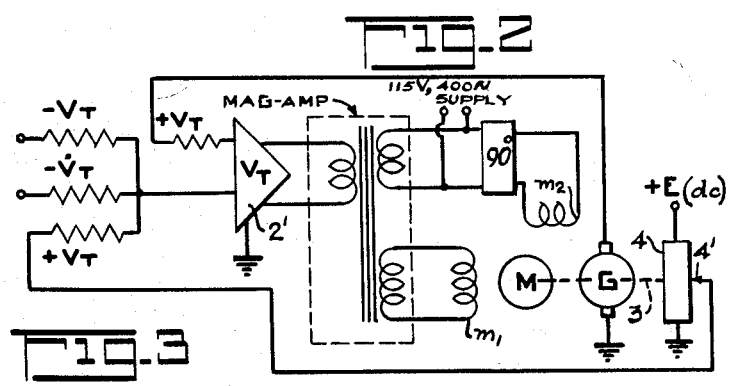
INVENTOR
ROBERT G. STERN
HIS ATTORNEY

United States Patent Office 3,171,954
Patented Mar. 2, 1965

3,171,954
ANALOG COMPUTING SYSTEM HAVING DYNAMIC SERVO RESPONSE
Robert G. Stern, West Caldwell, N.J., assignor to Curtiss-Wright Corporation, a corporation of Delaware
Filed Feb. 8, 1960, Ser. No. 7,349
3 Claims. (Cl. 235—184)

The present invention relates to analog computing systems of the type having servo motor means responsive to computer signals or voltages for in turn controlling one or more function generators.

Servo motor multipliers and function generators are widely used in analog simulation. From the standpoint of low cost and reliability, especially in a complex, special purpose computing system such as for a flight simulator, the servos have advantages over the presently available all-electronic devices, such as D.C. computers having purely electronic computation. However, the conventional servos are limited in their dynamic response and "threshold," i.e. the minimum amount of input signal required to cause a perceptible motion of the servo shaft. The presence of these shortcomings in a closed-loop computer sometimes introduces dynamic error in computation or unwanted oscillation such as that experienced in some A.C. flight simulating systems. Whereas this is not too severe a problem in comparatively low-speed flight simulation, it can be objectionable in higher speed systems such as required for jet-type aircraft simulation.

The use of D.C. electronic integrators will overcome a certain amount of the difficulties encountered in A.C. computers due to the higher speed of purely electronic integration. Nevertheless this does not mean that such a D.C. system is perfect in every respect; the same servo response problem is still there, although to a lesser extent. Closed-loop D.C. computers in fact require very careful design where any servos are used. From an operation standpoint therefore, a satisfactory solution may involve a practical combination of desirable features of A.C. electro-mechanical computers and D.C. electronic computers.

A principal object of the present invention is to overcome servo response problems in analog computers by means of improved and simplified servo circuitry wherein the servo is controlled according to both position and integration principles.

A further object of the invention is to improve the dynamic response and accuracy of the servo, especially where the input signal may be comparatively small.

In accordance with this invention the characteristics of position and integrating servos are so combined in novel manner as to preclude "drifting," i.e. cumulative deviation of the output signal with respect to the input signal, and a derivative of the input signal together with the integrated value thereof are used to provide improved and positive dynamic response of the servo for all values of the input signal.

The invention will be more fully set forth in the following description referring to the accompanying drawing, and the features of novelty which characterize the invention will be pointed out with particularity in the claims annexed to and forming a part of this specification.

Referring to the drawing, FIG. 1 is a diagrammatic illustration of a simplified form of the invention for controlling by way of example, servo means operable according to a flight variable such as true air speed ($V_T$) for producing in turn computer signals that are a function of $V_T$;

FIG. 2 is a similar illustration of a more involved form of the invention for controlling servo means according to other flight variables, and FIG. 3 is a diagrammatic illustration of a form of D.C.-A.C. amplifying arrangement for controlling an A.C. servo motor such as may be used herein.

Referring to FIG. 1, the input signals for the servo computing system are represented as $+\dot{V}_T$ and $-\dot{V}_T$, i.e. first derivatives of $V_T$. These signals are obtained from the main flight simulating computer system, of which the system of FIG. 1 may be a part. In brief, the main flight computer is basically controlled by electric signals generated according to pilot movement of simulated aircraft controls, primarily the aileron, elevator, rudder and throttle controls. These signals correspond to moments or forces with respect to the three axes of the aircraft and these may be represented as functions of the derivative of air speed. By well-known inverter means, oppositely polarized input signals $+\dot{V}_T$ and $-\dot{V}_T$ are readily obtained. In practice, these signals are generally available as such from the main flight computer.

The servo system responsive to these input signals in a manner presently described for producing function signals is shown generally at 1, and comprises a servo amplifier 2 for controlling in turn a motor-generator set and a plurality of potentiometers or function generators. The amplifier 2, where a combined D.C.-A.C. system is used may for example take the form of apparatus diagrammatically shown in FIG. 3 hereinafter described, wherein a D.C. amplifier output is fed to a magnetic amplifier that in turn controls an A.C. servo motor. The output of amplifier 2 drives a motor M of suitable type and a feedback generator G according to well-known practice. The motor output shaft indicated at 3 gang-operates a plurality of potentiometers, herein called "pots," including the slider 4' of an "answer" pot 4 that is energized by a constant voltage $+E_{(dc)}$, and one or more sliders 5' of pots generally indicated at 5 for deriving additional function signals. An A.C. servo system of this type having wound-card pots as function generators is more fully described in my Patent No. 2,803,893, granted August 27, 1957.

The servo amplifier 2 is preferably of the D.C.-A.C. type diagrammatically shown by FIG. 3 wherein the D.C. inputs for the D.C. amplifier 2' are summed to energize a conventional magnetic amplifier designated MAG-AMP, the A.C. output of which energizes the control winding $m_1$ of a conventional two-phase A.C. motor. The motor reference winding $m_2$ is suitably energized by a 90° dephased reference voltage as indicated. The motor drives a D.C. generator for providing the D.C. feedback signal at the D.C. amplifier input.

The D.C. input signals referring now to FIG. 1, for the servo amplifier 2 comprises a velocity feed-back signal $+\dot{V}_T$ at the input network resistance 6 representing the rate of angular change of the servo shaft angle, a signal at the network resistance 7 representing the integrated value $V_T$, a signal $-\dot{V}_T$ at resistance 8 representing the first derivative of $V_T$, and an answer signal $+V_T$ at resistance 9 from the answer pot 4. These signals are algebraically summed at the amplifier input in well-known manner to produce a resultant signal for operating the servo motor. The $V_T$ input signal may be conveniently obtained without time delay from the $+\dot{V}_T$ input signal by means of a D.C. integrating amplifier 10 of conventional design. As shown, the signal $-\dot{V}_T$ may be considered the primary signal.

Although the input signals indicated are the principal ones, it will be understood that in practice other modifying signals representing other flight factors may also be fed to the input network.

In the operation of the system of FIG. 1, two pairs of signals at the input or proportioning resistances 6, 7, etc. are oppositely polarized as indicated so that the resultant signal represents the integrated factor $V_T$. In particular, the generator feed-back signal $+\dot{V}_T$, is oppositely polarized with respect to the primary input signal $-\dot{V}_T$ so as to ensure accurate servo integration for producing $V_T$, and the input signal $-V_T$ is opposed by the answer signal $+V_T$ so as also to ensure correct servo positioning, thereby precluding drift of the function generator signals with respect to the primary input signal $-\dot{V}_T$. For purposes of stability, and accurate integration, a fairly high feed-back signal $+\dot{V}_T$ is used in the integrating operation. This ensures close relationship of the servo motor speed to the $-\dot{V}_T$ input signal, or integrand, for precise integration.

It will thus be apparent that the servo system 1 functions in a dual sense, i.e. both as an integrating servo and as a positioning servo and it will now be shown that it is capable of fast and dynamically accurate response due to instant application of the $-\dot{V}_T$ signal.

Considering first a conventional integrating servo wherein the servo amplifier is fed by two essential inputs, namely the rate signal to be integrated and the oppositely polarized negative feed-back signal from the servo generator, a practical disadvantage is here involved due to sluggish or no response of the motor to fairly low values of the input signal. Where the servo system in its usual capacity also has one or more function generators for producing fuction signals for the computer, the result is that these signals do not have proper relative value to the correct integrated value of the rate signal. Inaccuracies in the function signals are in turn reflected throughout the computer system.

The conventional positioning servo on the other hand also has certain disadvantages. In this case the servo amplifier usually has three primary inputs, namely the main signal to be represented as a shaft angle of the servo, a rate or feedback damping signal from the servo generator and an answer or position signal from a servo-operated pot. The answer signal is oppositely polarized with respect to the main signal. Thus, an unbalance is inherently present in the dynamic operation of the servo and introduces small errors in the function signals, except of course in the static state of the system.

The above disadvantages of both systems are substantially eliminated by this invention wherein the two pairs of oppositely polarized rate and position voltages ensure not only balance and stability, but also provide for positive and immediate operation of the servo at low rate values by reason of the instant application to the servo of the signal $-\dot{V}_T$.

Summarizing, it will now be apparent that the $\dot{V}_T$ servo loop provides for dynamic accuracy and the $V_T$ loop provides for long-term static accuracy.

Referring now to FIG. 2, there is shown a more involved form of the invention for controlilng a servo 20, the shaft angle of which represents another flight variable, namely flight angle $\gamma$. The flight angle of aircraft is that defined by the horizontal and the flight direction of the center of gravity of the aircraft. It is therefore equal to the difference between the pitch attitude, i.e. the angle between the horizontal and the longitudinal axis of the aircraft, and the angle of attack ($\alpha$) which is the angle between the wing chord and the direction of the air stream.

FIG. 2 shows a servo computing system embodying the invention of FIG. 1 and especially adapted for fast computation of sine-cosine functions where the sine functions are comparatively low or near zero and the cosine functions are in the neighborhood of 90°. This system is therefore well suited for computing the flight angle $\gamma$, in particular sin $\gamma$, which in practice is usually quite small.

In FIG. 2 the servo system 20 for producing other computer signals that are a function of $\gamma$ comprises a network 21 for the servo amplifier 22 that, as in the previous case, is energized by two pairs of oppositely polarized input signals at the proportioning resistances 23–24, 25, 26 and 27. As will be explained later, the inputs at 23 and 24 are the components of the signal $+\dot{\gamma}$, or integrand, which is opposed in the integrating operation by the feed-back or rate signal $-\dot{\gamma}$ from the servo generator G. The positioning operation is controlled as before by oppositely polarized control and position signals $+\sin \gamma$ and $-\sin \gamma$ derived respectively from the D.C. integrating amplifier 28, and the slider 29' of the cosinusoidal contoured answer pot 29. Thus the servo 20 basically functions both as an integrating servo and a positioning servo as previously described.

In addition to the positioning pot, the servo motor M controls through the mechanical connection 3' a function pot 30 that is energized at its midpoint at 31 by a signal $-\dot{\gamma}$ that in turn is derived from a separate system of the main computer as presently described. The pot 30 is suitably contoured and is grounded through calibrated resistances 32 and 33 at its terminals so that the derived signal at slider 30' represents $-\dot{\gamma} \cos \gamma$. This signal is fed by line 34 to the input resistance 35 of the integrating amplifier 28, the integrated output of which is the signal $+\sin \gamma$ above referred to.

The production of the signal sin $\gamma$ is critical in flight simulators since it must be both accurately computed and available without delay for the main flight computer to achieve realistic simulation. That is, considering the aircraft itself, movement of the elevator is followed quickly by a change in pitch attitude and subsequently in flight angle, and this action should be reflected in the simulator. This is accomplished by the fast application of the $-\dot{\gamma}$ signal from the roll ($\phi$) servo system etc. to the cosinusoidal function pot 30, from which the derived signal $-\dot{\gamma} \cos \gamma$ is instantly applied to the integrator 28. Hence, the integrator output sin $\gamma$ is readily available for use in other parts of the main computing system. Also, since sin $\gamma$ is at best a small quantity it is essential that small variations therein be accurately computed. This is accomplished by means of the servo function pot 30 that derives the signal $-\dot{\gamma} \cos \gamma$ which approaches unity or maximum value. The integrator 28 using this larger value is therefore capable of producing a more finely graduated sin $\gamma$ signal with minimum error.

The derivation of the $+\dot{\gamma}$ and $-\dot{\gamma}$ signals for the servo system 20 may be accomplished as shown in FIG. 2 by other systems of the main flight computer including the roll ($\phi$), rate of pitch ($\omega_Y$), angle of attack ($\alpha$), rate of yaw ($\omega_Z$) and side slip ($\beta$) systems. Examples of these typical flight systems are shown in my Patent No. 2,731,-737, granted January 24, 1956.

The roll servo generally indicated at 40 comprises a servo amplifier 41 and motor M that controls through a mechanical connection 3'' the cosinusoidal function pots 42 and 43. The pot 42 is energized at its midpoint by a signal $+(\omega_Y-\alpha)$ derived from other conventional systems (not shown) and is grounded at its terminals through calibrated resistances 44 and 45. The derived output $+(\omega_Y-\alpha) \cos \phi$ at the slider 42' is fed by lines 46 and 47 to the input resistance 48 of the D.C. summing amplifier 49, and to the input resistance 24 of $\gamma$ amplifier 22 respectively. A constant K is introduced at 24 by the proportioning resistance.

The other pot 43 is energized at its opposite terminals by voltages $-(\omega_Z+\beta)$ and $+(\omega_Z+\beta)$ from other conventional systems and is grounded at midsection so as to derive at slider 43' a signal $-(\omega_Z+\beta) \sin \phi$ that in turn is also fed to both amplifiers 49 and 22 at the input resistances 50 and 23 respectively. The amplifier output $-\dot{\gamma}$ also is a feed-back signal at resistance 51.

It can readily be shown that the aerodynamic quantities at the input resistances 48 and 50 of amplifier 49 represent the components of $+\dot\gamma$, and that the quantities at the input resistances 23 and 24 of amplifier 22 are also the components of $+\dot\gamma$. Accordingly, the output of summing amplifier 49 represents a $\gamma$ quantity.

Summarizing the operation of FIG. 2, it will be seen that the primary object of obtaining a fast and accurate sin $\gamma$ signal is accomplished by reason of the fact that a signal $-\gamma$ is already standing on the pot 30 so that the $\gamma$ amplifier 22 is instantly energized in accordance with any change in $\gamma$. The function quantity $-\dot\gamma \cos \gamma$ is more accurately adjusted as the $\gamma$ servo system 20 adjusts itself to the new value of $\gamma$. Hence the servo has started instantly to re-position itself in response to change in the $-\gamma$ signal so that delay due to servo inertia is largely avoided. In the event that the servo system 20 is slow in starting, the signal $+\sin \gamma$ is instantly available, although not finally adjusted, at the integrator output for instant application to other computers of the main system.

It should be understood that this invention is not limited to specific details of construction and arrangement thereof herein illustrated, and that changes and modifications may occur to one skilled in the art without departing from the spirit of the invention.

What is claimed is:

1. In an analog computer, a stabilized fast-response servo system for representing a condition as indicated by the instantaneous position of the servo, comprising a servo motor, a combined input signal network and amplifier for energizing said motor, an integrator, a first analog computer signal representing rate-of-condition change, a function generator energized by said computer signal and controlled by said motor for producing a non-linear rate function signal that in turn is applied to the input of said integrator, the output signal of said integrator representing the integral of the aforesaid non-linear rate function signal, means included in said servo system for producing a stablizing feedback signal representing rate-of-condition change, a second analog computer signal potential opposite in sense to said feedback signal likewise representing a rate-of-condition change, non-linear means for deriving according to the servo motor shaft angle a position signal opposite in sense to the aforesaid integrator signal, the aforesaid network being energized jointly by the aforesaid second computer rate signal, integrator signal, position signal and feedback signal so that the servo motor is energized to function both as a stabilized integrating servo and as a positioning servo for precluding drift or cumulative error of function signals with respect to the second computer rate input signal, and the non-linear output signal of said integrator is instantly available for use in the analog computer, independently of any lag in the response of the servo motor.

2. Apparatus as specified in claim 1 wherein the condition represented is a comparatively small angle such as aircraft flight angle $\gamma$, a rate signal representing $\dot\gamma$ is fed to the servo-controlled function generator for producing a signal $\dot\gamma \cos \gamma$ and this signal energizes the integrator for producing the required stabilized computer signal sin $\gamma$.

3. In an analog computer, a stabilized fast-response servo system for representing a condition as indicated by the instantaneous position of the servo comprising an A.C. servo motor, a D.C. input signal network feeding into a D.C.-to-A.C. amplifier for energizing said motor, a D.C. integrator, the analog computer generating a pair of rate-of-condition change signals opposite in sense, a cosinusoidal function generator energized by one of said computer signals and controlled by said motor for producing a non-linear rate function D.C. signal that in turn is applied to the input of said integrator, the output signal of said integrator representing the integral of the aforesaid non-linear rate function signal, means included in said servo system for producing a stabilizing feedback signal according to the instantaneous speed of the servo motor, non-linear cosinusoidal means for deriving according to the servo motor shaft angle a position signal opposite in sense to the aforesaid integrator output signal, the aforesaid network being energized jointly by the other of said computer rate signals, integrator signal, position signal and feedback signal so that the servo motor is energized to function both as a stabilized integrating servo and as a positioning servo for precluding drift or cumulative error of function signals with respect to the aforesaid network input computer rate signal, and the non-linear output signal of said integrator is instantly available for use in the analog computer, independently of any lag in the response of the servo motor.

References Cited in the file of this patent

UNITED STATES PATENTS

| | | |
|---|---|---|
| 2,715,995 | Wirkler | Aug. 23, 1955 |
| 2,954,514 | Hemstreet | Sept. 27, 1960 |
| 3,018,051 | Hemstreet | Jan. 23, 1962 |